United States Patent
Alpert et al.

(10) Patent No.: US 9,940,731 B2
(45) Date of Patent: Apr. 10, 2018

(54) UNSUPERVISED ASYMMETRY DETECTION

(71) Applicant: International Business Machines Corporation, Armonk, NY (US)

(72) Inventors: Sharon Alpert, Rehovot (IL); Miri Erihov, Kiryat Tivon (IL); Pavel Kisilev, Maalot (IL)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 14/845,384

(22) Filed: Sep. 4, 2015

(65) Prior Publication Data
US 2017/0069113 A1  Mar. 9, 2017

(51) Int. Cl.
| | | |
|---|---|---|
| G06K 9/00 | (2006.01) | |
| G06T 7/60 | (2017.01) | |
| G06T 7/00 | (2017.01) | |
| G06T 7/20 | (2017.01) | |
| G06T 7/40 | (2017.01) | |

(52) U.S. Cl.
CPC ............ *G06T 7/608* (2013.01); *G06T 7/0012* (2013.01); *G06T 7/2053* (2013.01); *G06T 7/408* (2013.01); *G06T 2207/10024* (2013.01); *G06T 2207/10072* (2013.01); *G06T 2207/30096* (2013.01)

(58) Field of Classification Search
CPC ......... G06K 2009/4666; G06K 9/4642; G06K 9/4671; G06T 7/223; G06T 7/32
See application file for complete search history.

(56) References Cited

U.S. PATENT DOCUMENTS

| | | | |
|---|---|---|---|
| 8,351,740 B2 * | 1/2013 | Pham | G06K 9/32 382/205 |
| 2009/0245692 A1 * | 10/2009 | Okutomi | G06T 7/32 382/294 |
| 2012/0099796 A1 * | 4/2012 | Zitnick, III | G06K 9/4642 382/199 |
| 2013/0028516 A1 * | 1/2013 | Warfield | G06T 1/00 382/173 |
| 2017/0069113 A1 * | 3/2017 | Alpert | G06T 7/608 |

* cited by examiner

*Primary Examiner* — Gandhi Thirugnanam
(74) *Attorney, Agent, or Firm* — Stosch Sabo (57) ABSTRACT

Asymmetries are detected in one or more images by partitioning each image to create a set of patches. Salient patches are identified, and an independent displacement for each patch is identified. The techniques used to identify the salient patches and the displacement for each patch are combined in a function to generate a score for each patch. The scores can be used to identify possible asymmetries.

14 Claims, 5 Drawing Sheets

UNSUPERVISED ASYMMETRY DETECTION

BACKGROUND

The present disclosure relates to image analysis, and more specifically, to asymmetry detection.

Asymmetry detection is used, for example, in the medical field to identify tumors and other abnormalities in organs. Asymmetry detection can use a variety of methods to automate image analysis. The various methods are associated with a range of accuracies and costs.

SUMMARY

Embodiments are directed toward a method for comparing images. The method can include identifying a first image and a second image, and partitioning each image to create a set of patches for each image where each patch contains a plurality of pixels. The method can further include determining a difference between at least a portion of the patches of each image and an average patch of the image, and identifying a minimum cost translation for each patch of the first image to a corresponding patch of the second image where each translation is independent, and where the minimum cost translation comprises a minimum change in a set of patch statistics between a first patch, or portion thereof, of the first image and the corresponding patch, or portion thereof, of the second image. The method can further include calculating a score for at least a portion of the patches where each score includes the difference and the minimum cost translation.

Various embodiments are directed toward a system for comparing images. The system can include a memory configured to store a first image and a second image, a graphical display configured to display an output, and a processor coupled to the graphical display and to the memory. The processor can be configured to obtain the first image and the second image from the memory, and to partition each of the first and second images to create a plurality of patches for each image where each patch comprises a plurality of pixels. The processor can be further configured to determine a difference between at least one patch, or portion thereof, of each image and an average patch, or portion thereof, of the image, and to identify a selective shift for each patch, or portion thereof, of the first image to a corresponding patch, or portion thereof, of the second image, where each shift is independent of each other shift, and where the selective shift represents a minimum change in a set of pixel statistics between a respective patch, or portion thereof, of the first image and the corresponding patch, or portion thereof, of the second image. The processor can be further configured to calculate a score for at least a portion of the patches where the score includes the difference and the selective shift. The processor can be further configured to output at least one score to the graphical display for displaying on the graphical display.

Certain embodiments are directed toward a computer program product for identifying asymmetries between a plurality of images. The computer program product can include a computer readable storage medium containing program instructions which are executed by a processor. The instructions executed by the processor can cause the processor to identify a first image and a second image where the first image and the second image include two discrete images or two portions of a same image where the two portions are separated according to an approximate axis of symmetry. The instructions executed by the processor can further cause the processor to partition each image to create a set of patches where each patch comprises a plurality of pixels, and to identify salient patches of each image. The instructions executed by the processor can further cause the processor to identify a respective patch displacement for at least the salient patches such that each displacement is independent. The instructions executed by the processor can further cause the processor to present a score for at least each salient patch where the score comprises the saliency and the patch displacement for at least each salient patch.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Computational image analysis can automate and standardize the interpretation of information contained in various images. Images can contain significant amounts of data which can result in impractical analysis using some computational methods. Furthermore, individual image analysis by trained professionals is costly. Thus, an expeditious, consistent, and accurate method of computational image analysis may provide numerous advantages to, for example, the medical industry.

A specific field of image analysis involves medical image analysis. Medical image analysis characterizes the information contained in images generated by methods such as, but not limited to, electron microscopy (EM), x-ray computed tomography (CT), magnetic resonance (MR), single photo emission computed tomography (SPECT), positron emission tomography (PET), and computed radiography (CR), among others. Medical professionals can use these images to identify health issues. One such health issue is tumor identification.

Asymmetry detection is one strategy employed by some medical professionals to identify tumors. Asymmetry detection compares images of a pair of organs to identify discrepancies between the two images which may constitute a tumor. Asymmetry detection can be similarly employed in cases where the same body part is imaged at two different times. Asymmetry detection can be further similarly employed in cases where a single, symmetric organ (e.g., the brain) is compared for internal asymmetries with respect to an internal axis of symmetry (e.g., the Mid-Sagittal Plane of a brain).

Asymmetry detection techniques can be categorized as supervised or unsupervised. Supervised asymmetry detection includes "training" in the form of a set of reference images demonstrating true and false results (i.e., images containing identified examples of asymmetries). Thus, a technique employing supervised asymmetry detection compares a query image to a set of reference images with known true and false readings, and the technique determines a true or false reading based on the levels of similarity between the query image and the various reference images. Unsupervised asymmetry detection relies on the information provided within the given image data to determine if asymmetries are present. Thus, a technique employing unsupervised asymmetry detection may identify asymmetries between a set of images, or within a single, approximately symmetric image, using only the information contained within the image(s).

Asymmetry detection techniques can be further characterized as requiring or not requiring alignment. Asymmetry detection techniques requiring alignment necessitate approximately identical alignment to produce approximately identical image positioning. Following consistent alignment, the image analysis system compares each portion of one image with the corresponding (according to position) portion of the second image. Accurate image alignment is difficult to achieve due to the number of variables which affect each image. For example, some variables which may affect consistency between images are patient shifting, patient breathing, patient weight change, patient bladder fullness, variations between techniques of medical professionals, and so on.

Advantageously, the present disclosure provides a method and system for asymmetry detection which is unsupervised and does not require alignment. Unsupervised asymmetry detection can reduce costs associated with "teaching" a program to identify asymmetries. Furthermore, asymmetry detection which does not require alignment can reduce the number of false asymmetry detections. It should be understood that not all advantages of the present disclosure are herein described. Furthermore, embodiments of the present disclosure exist which contain none, some, or all of the presently listed advantages while remaining within the spirit and scope of the present disclosure.

In some embodiments, the present disclosure identifies asymmetries by identifying sets of pixels which are distinct both internally within an image and externally between a pair of images. The distinctness (i.e., saliency) of a set of pixels within an image is characterized by a degree of difference of the patch under consideration compared to the average patch of the image. A set of pixels is externally salient when a best-match pair of patches exhibit a high degree of difference compared to other best-match pairs of patches.

Figure 1:
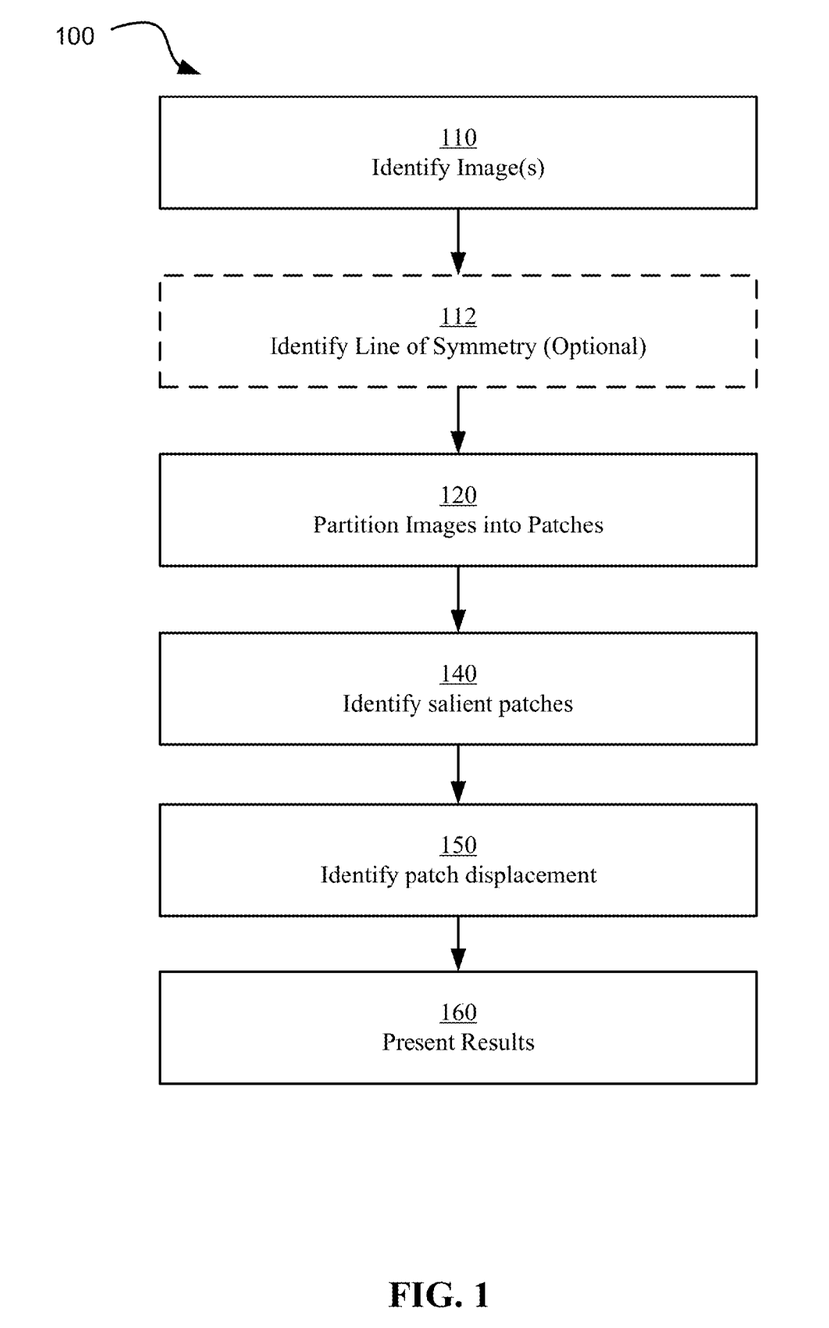
FIG. 1 illustrates a flowchart of one example embodiment for identifying asymmetries between two images.

Referring now to the figures, FIG. 1 illustrates a flowchart of one example embodiment for identifying asymmetries between an approximately symmetric image or between two images. The method 100 starts by identifying images in operation 110. The images can be any type of image including, but not limited to, electron microscopy (EM), x-ray computed tomography (CT), magnetic resonance (MR), single photo emission computed tomography (SPECT), positron emission tomography (PET), and computed radiography (CR), among others. The images can be two dimensional or three dimensional, or a set of two dimensional images wherein the plurality of images represents a third dimension.

The images can be comprised of data points, such as, for example, pixels. The data points can contain numerous types of information which can be collectively referred to as statistics (e.g., pixel statistics, patch statistics, etc.). For the purposes of the present disclosure, the statistics of an image, or portion thereof, refer to any data contained within an image which reflects the color, brightness, darkness, contrast, hue, luminance, or other visual characteristic of the image, or portion thereof. In some embodiments of the present disclosure, the image statistics may be represented as a binary number (e.g., foreground or background), a single number (e.g., grayscale images wherein each number represents the brightness of the pixel from black—no brightness, to white—maximum brightness), or a set of numbers (e.g., the RGB color space wherein a pixel comprises three vectors, or, alternatively, wherein a pixel comprises three "grayscale" numbers, each one associated with red, green, and blue respectively). It should be understood that the cited illustrative image statistics are described by way of example only and should not be construed as limiting for the purposes of the present disclosure.

In operation 112 (indicated as optional via the dotted box), a line of symmetry can be identified in each image. For example, if a single image is selected in operation 110, a line of symmetry can be created in operation 112 to effectively partition the single image into two images for comparison. In an alternative example, if a plurality of images are selected in operation 110, a line of symmetry can be created in each image. In such an example, multiple images each containing at least one line of symmetry can be used to monitor asymmetry (e.g., tumor) growth or reduction over time. That is to say, in an illustrative first brain scan, a line of symmetry can be created and asymmetries identified between the approximately symmetric halves. An illustrative second brain scan taken at a later time can be similarly compared across an internal line of symmetry for asymmetries. Subsequently, the asymmetries identified in the first brain scan can be compared to the asymmetries identified in the second brain scan to identify changes in the one or more asymmetries over time.

Although operation 112 is shown occurring between operations 110 and 120, in alternative embodiments operation 112 occurs as a sub-component of operation 140 where salient patches are identified. Thus, methods employed in later operations can also determine the probable line of symmetry within a given image.

In operation 120, the images are partitioned. The partitioning results in a plurality of patches. Each patch comprises a plurality of data points (e.g., pixels). The patches can be two-dimensional or three dimensional, and can comprise any geometry such as, but not limited to, square, rectangular, triangular, cubic, conical, and so on. Partitioning and patches as they relate to the present disclosure are described in further detail herein with respect to operation 220 of FIG. 2.

In operation 140 salient patches are identified. In some embodiments of the present disclosure, the salient patches are identified as patches of an image which are both internally and externally salient. Patches are internally salient in cases where the patch statistics are not readily describable by surrounding patches. In some embodiments, the patch statistics of one or more patches are compared to the statistics of the average patch of the image. In some embodiments, this comparison is made using principal component analysis (PCA). Thus, internally salient patches exhibit a high degree of difference (compared to other patches within the image) with respect to the average patch of the image according to the direction of, and/or the variation along, one or more principal components of the patch under consideration and the average patch of the image. In some embodiments, the analysis of internal saliency is conducted for patches which exhibit an external saliency above a first threshold.

In some embodiments, patches are externally salient in cases where the difference between the respective patch statistics of the first image and the respective patch statistics of the closest matched patch of the second image is above a first threshold. In some embodiments, external saliency can be defined by the difference in variation exhibited along the same principal components of the two patches. In various embodiments the first threshold is user defined or an automatically selected number or percentage.

In operation 150 patch displacement between the two images is characterized. Operation 150 can account for differences in alignment (i.e., orientation) and/or size (i.e., amount of zoom) between the images under consideration. In some embodiments, patch displacement is characterized by independently applying randomized displacement vectors to patches, or portions thereof, and calculating a similarity value between the patch statistics of the patch, or portion thereof, of the first image with the patch statistics of the displaced patch, or portion thereof, of the second image. In some cases, the process is iterative, and thus, numerous calculations can be conducted wherein each iteration is localized to the area of the best match of the previous iteration. In some alternative embodiments, each iteration can be localized to a range of directions or magnitudes based on the previous iteration(s). Thus, subsequent iterations can use a set of randomized displacement vectors having a limited range of randomness where the limited range of randomness is a function of the previous iteration(s) and limits the direction, the magnitude, or both the magnitude and the direction of the subsequent set of random displacement vectors.

In operation 160 the results of the analysis are consolidated and presented. In some embodiments, the results of operations 140 and 150 are presented separately. In some embodiments the results of operations 140 and 150 are presented by a single, integrated score (i.e., a saliency score). In some embodiments the saliency score is a function of the salient patch measures and the patch displacement measures as will be further described herein with respect to FIG. 2.

The results can be presented in a variety of ways. For example, the results can be presented via a graph, a table, or an image. In cases where the results are presented as an image (e.g., an overlay on the original image(s) identified in operation 110), the results can indicate the location of the identified asymmetry or asymmetries within the image.

Figure 2:
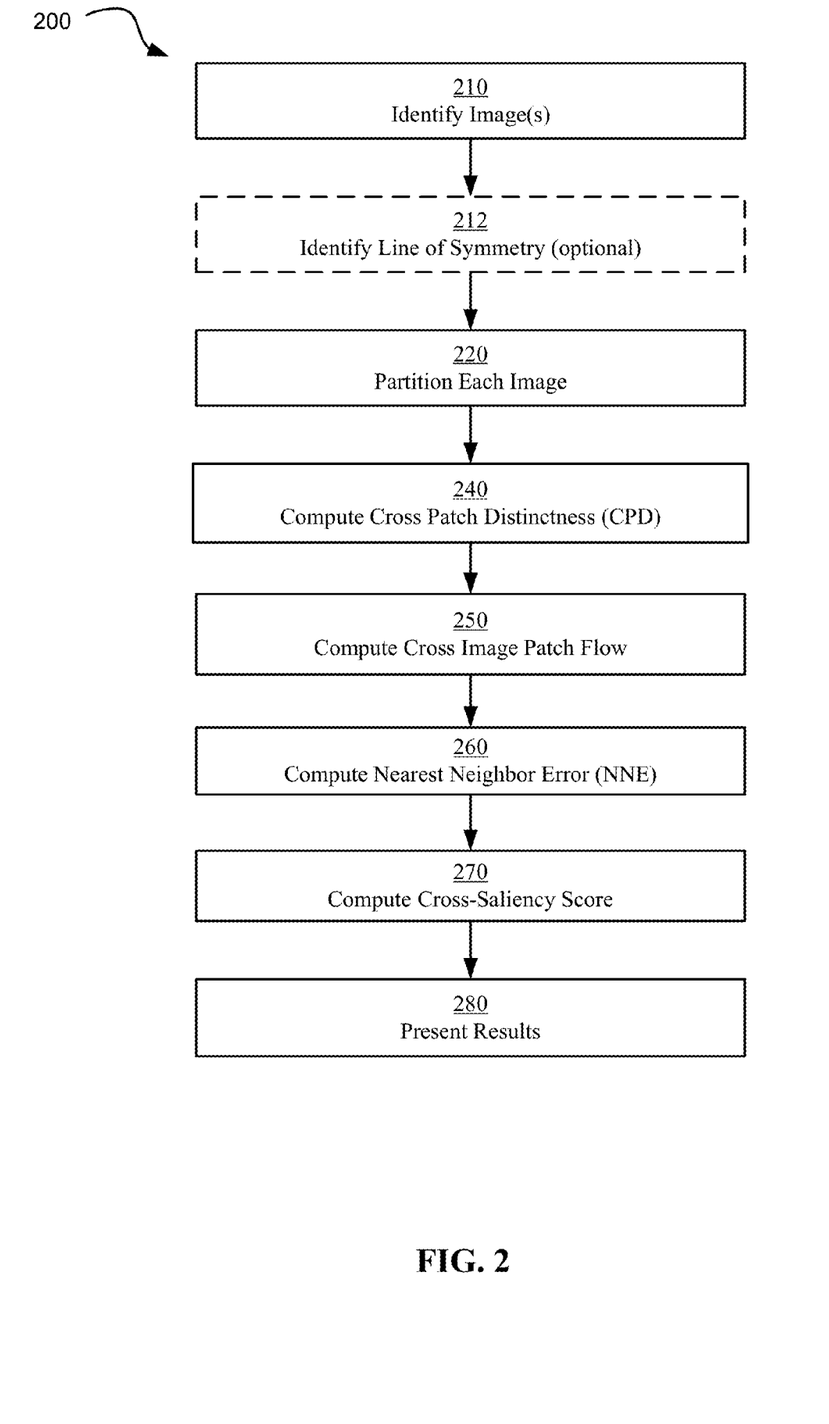
FIG. 2 illustrates a flowchart for identifying asymmetries between two images according to various embodiments of the present disclosure.

Referring now to FIG. 2, illustrated is a flowchart for identifying asymmetries between a single, approximately symmetric image or between two images according to various embodiments of the present disclosure. The method 200 can begin with identifying the query image or images in operation 210. In various embodiments, either a single image or a plurality of images are identified. In cases where a single image is identified, the method 200 determines at least one line of symmetry within the image as indicated by optional operation 212. Thus, in cases where a single image is identified, the method 200 seeks asymmetries between at least two symmetrical portions of the single image. In cases where a plurality of images are identified, the method 200 seeks asymmetries between each respective image. For the purposes of the present disclosure, in cases where two images are cited, it should be understood that the two images can refer to two discrete images or to two portions of an approximately symmetric image where the two portions are separated by the line of symmetry identified in operation 212. Operation 212 can occur between operations 210 and 220 as shown, or, alternatively, operation 212 can occur as a sub-operation of, for example, operation 230 wherein the method employed by operation 230 can, in some embodiments, automatically identify a line of symmetry within a given image.

In operation 220, the patches are identified for each respective image, or, in the case of a single image, for each symmetric portion of the image. An image patch is a sub-area of an image. In some embodiments, an image patch is measured by pixels. In alternative embodiments, an image can be separated into a given number of sections. For example, an image can be broken into 256 sections comprising a 16×16 square of patches. Alternatively, an image can be segmented into 5×5 pixel square patches with the number of patches being a function of the total number of pixels of the image. Although the previous examples use square patches, rectangular, polygonal, ovoidal, or other regular or irregular geometric shapes can be similarly used to define the various patches. Furthermore, patches in excess of two dimensions are possible, such as, but not limited to, cubic patches, in cases where the image(s) are three dimensional.

Operation 240 computes cross patch distinctness (CPD) scores. In some embodiments, the CPD score is calculated for each respective pair or set of patches. In alternative embodiments, the CPD score is calculated for a subset of the total number of patches. The CPD calculation accounts for patch distinctness (i.e., saliency) within and between images. The CPD calculation can use a gating variable, namely, $c_j$, such that the gating variable moderates the influence of each principal component (PC) based on cross-correlations between the two images under comparison. In some embodiments, the equation for CPD is:

$$\text{CPD}(p_{x,y}) = \Sigma_{j=1} c_j |p_{x,y} w_k^T| c_j \in C, C \in \{0,1\}^n$$

In the previous equation, $p_{x,y}$ is a vectorized patch and $w_k^T$ is the k'th principal component of the distribution of all patches in the image. Thus, a larger score indicates increasing distinctness of a given patch compared to the other patches of the image. The CPD score introduces the gating variable $c_j$ which excludes consideration of some patches which are not sufficiently distinct to be considered a possible asymmetry. Gating variable $c_j$ reduces the number of computations, and, thus, reduces the amount of resources and time required to conduct asymmetry analysis according to some embodiments of the present disclosure. Gating variable $c_j$ can be considered a first threshold in some embodiments of the present disclosure. The gating variable $c_j$ can be user defined or automatically selected, and it can constitute a number or a percentage of the results.

In some embodiments, respective patches of each image are matched using a bi-partite matching method. As is understood by one skilled in the art, bi-partite matching finds the minimum cost set of associations uniquely connecting one group of data to a second group of data. That is to say, each data point of the first set is connected to one and only one data point of the second set. In embodiments of the present disclosure, the first set of data are the PCs of the patches of the first image and the second set of data are the PCs of the patches of the second image. In embodiments, the PCs of each image are matched using the cosine distance as the cost. The cosine distance is defined as:

$$\text{cost} = 1 - \cos\theta$$

In the above equation, $\theta$ represents the angle formed between the PCs of the matched patches. Thus, cost will be minimized in cases where $\theta$ is minimized. The angle $\theta$ will be minimized in cases where the principal components of the matched pair approach parallel.

Following the matching, gating vectors $C_{1,2}$ are defined according to some embodiments. In some embodiments, the gating vectors are used to select a subspace of the patches which will be used in the final analysis and/or the CPD equation. The subspace, as opposed to the full space, expedites the process by reducing the number of computational operations required. Thus, for the first and second images respectively, the PCs or patches are selected according to gating variables determined by the following equations:

$$C_1 = \arg\max \Sigma_j c_j (v_j^1 - v_j^2) - \lambda \|C_1\|_1 c_j \in \{0,1\}$$

$$C_2 = \arg\max \Sigma_j c_j (v_j^2 - v_j^1) - \lambda \|C_2\|_1 c_j \in \{0,1\}$$

In the above equation, $v_j^2$, $v_j^1$ represents the relative variance of the j'th PC of the second and first images respectively. The $\lambda \|C_1\|_1$ term is a normalizing term used to simplify the output of the computation. Thus, patches are considered externally salient wherein the matched pair of patches exhibits a large degree of difference in variation along similar PCs. Specifically, in some embodiments, externally salient patches are defined in cases where the difference in variation between the matched patches is above a first threshold. In various embodiments, the first threshold refers to $c_j$, $C_1$, $C_2$, or any combination of the aforementioned.

In addition to calculating the CPD distinctness score, aspects of the present disclosure calculate image patch flow between two images to account for translations, rotations, or other variations in alignment between the two images. Thus, in operation 250, a cross image patch flow is calculated for each pair or set of patches, or for a subset of the total number of patches according to various embodiments. The image patch flow method measures how well each patch fits the smooth motion field assumption. The smooth motion field assumption allows each patch to move independently of each other patch (e.g., considering patch displacements measured in a polar coordinate system, one hypothetical patch can be translated 5 units at 35 degrees while a different patch can be translated 1 unit at 280 degrees). Thus, embodiments of the present disclosure using the patch flow methods as disclosed herein, allow for two images to be implicitly aligned (i.e., using the patch flow method herein disclosed) as opposed to requiring an alignment step. To test the smooth motion field assumption, a randomized correspondence algorithm (e.g., PatchMatch) can be used for each patch as follows:

$$D(p_{x,y}, p_{x+T_x, y+T_y}) = \Sigma_{i=x-n/2}^{i=x+n/2} \Sigma_{j=y-n/2}^{j=y+n/2} \|I_1(i,j) - I_2(i+T_x, j+T_y)\|_2$$

The randomized correspondence algorithm applies at least one random displacement vector T to at least one pixel location (x,y) of each patch. The displacement vector T marks the hypothetical, shifted location of the same pixel location in the second image. $I_{1,2}$ can represent image intensity values of the respective pixels (or other statistics), and thus, provides a measure of similarity between the pixel of the first image and the pixel located at the predetermined displacement of the second image. The best match displacement vector can be selected from each set of randomized displacement vectors. The process can be iterated multiple times using propagated and random displacements to converge to a sufficient approximation of the flow field under the smooth motion field assumption. In some embodiments, four to five iterations result in convergence to an approximation of the flow field under the smooth motion field assumption. Thus, following a sufficient number of iterations, the two images can be appropriately matched regardless of original discrepancies in orientation, position, and/or subject size (i.e., zoom level) of the respective images.

Following the randomized correspondence algorithm, operation 260 measures the consistency between each patch and the smooth motion field assumption by identifying nearest neighbor error (NNE) according to the following equation.

$$\text{NNE}(p_{x,y}) = \min_T D(p_{x,y}, p_{x+T_x, y+T_y})$$

The nearest neighbor error is minimized for all pixels, all patches, a subset of pixels, a subset of patches, or a subset of pixels in a subset of patches. Thus, the nearest neighbor error provides a second score, similar to the CPD score, which indicates the degree of similarity between a portion of the first image and its most similar counterpart in the second image.

In operation 270 the final cross saliency score (CS) is calculated. In various embodiments, the final score uses both CPD and NNE measurements. Both CPD and NNE measurements are normalized to allow for appropriate integration of the two measures. The CS can be described by the following equation:

$$CS(x,y) = \frac{1}{2l} \Sigma_{s=1}^{l} CPD(p_{x,y}) + NNE(p_{x,y})$$

In some embodiments, l represents the number of pixels of each patch which were measured by the CPD and NNE methods.

Lastly, in operation 280, the cross saliency scores are presented. The presentation can be in the form of a graph, a table, and/or the original image(s) overlaid with the cross-saliency scores for each respective patch of the one or more images. In some embodiments, the cross saliency scores are presented to a user via a graphical display.

It should be understood that although the method 200 comprising operations 210 through 280 is presented in a serial fashion, not all operations must necessarily occur in the order presented. For example, calculation of the CPD values can occur in parallel with the calculation of the cross-image patch flow and NNE values. Similarly, operation 280 can occur multiple times throughout the method 200, or can present the individual results of multiple operations of the method 200. Further still, operations can be added to the method 200, or existing operations illustrated with respect to the method 200 can be removed while remaining within the spirit and scope of the present disclosure.

Figure 3:
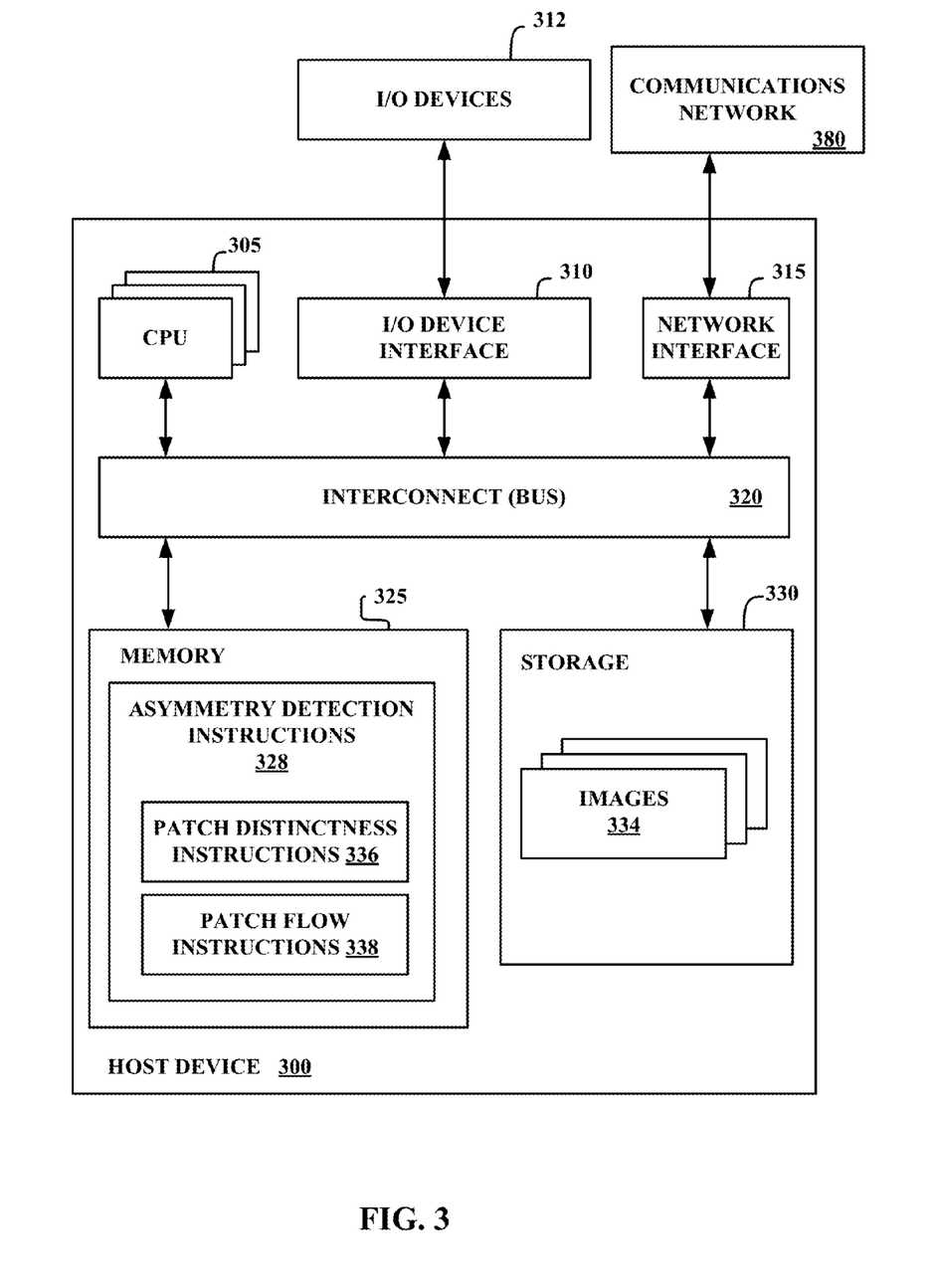
FIG. 3 is a block diagram of a host device according to some embodiments of the present disclosure.

With reference now to FIG. 3, shown is a block diagram of a host device according to some embodiments of the present disclosure. The host device 300 can include, without limitation, one or more processors (CPUs) 305, a network interface 315, an interconnect 320, a memory 325, and a storage 330. The host device 300 can also include an I/O device interface 310 connecting I/O devices 312 (e.g., keyboard, display, and mouse devices) to the host device 300. The I/O devices 312 are capable of receiving a user-defined input and are capable of outputting asymmetry detection results.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 can be implemented using one or more busses. The CPUs 305 can be a single CPU, multiple CPUs, or a single CPU having multiple processing cores in various embodiments. In one embodiment, a processor 305 can be a digital signal processor (DSP). Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or Flash memory devices. In an alternative embodiment, the storage 330 can be replaced by storage area-network (SAN) devices, the cloud, or other devices connected to the host device 300 via the communication network 380 or the I/O devices 312.

The network 380 can be implemented by any number of any suitable communications media (e.g., wide area network (WAN), local area network (LAN), Internet, Intranet). The network 380 can be implemented within a cloud computing environment, or using one or more cloud computing services. Consistent with various embodiments, a cloud computing environment can include a network-based, distributed data processing system that provides one or more cloud computing services. Further, a cloud computing environment can include any number of computers disposed within one or more data centers and configured to share resources over the network 380.

The memory 325 stores asymmetry detection instructions 328. The storage 330 stores one or more images 334. Alternatively, the images 334 and the instructions 328 can be stored partially in memory 325 and partially in storage 330, or they can be stored entirely in memory 325 or entirely in storage 330, or they can be accessed over the network 380.

The asymmetry detection instructions 328 contain patch distinctness instructions 336 and patch flow instructions 338. In some embodiments, the asymmetry detection instructions 328 are executed by one or more CPUs 305 to analyze one or more images 334. The asymmetry detection instructions 328 can provide instructions matching, in whole or in part, the methods as described with reference to FIG. 1 and FIG. 2. The patch distinctness instructions 336 can provide instructions executable by a processor 305 similar to, in whole or in part, operations 140 of FIG. 1 and operation 240 of FIG. 2. The patch flow instructions 338 can provide instructions executable by a processor 305 similar to operations 150 of FIGS. 1 and 250 and 260 of FIG. 2.

As described herein, the present disclosure has numerous applications to numerous fields. Thus, it may be helpful to describe experimental results of exemplary embodiments of the present disclosure to further enable a person of skill in the art to appreciate the practical application of some embodiments of the present disclosure. It should be understood that the following experimental results are disclosed herein only for exemplary purposes and should not be construed as limiting to the various embodiments of the present disclosure. Embodiments of the present disclosure can display similar or dissimilar experimental results as disclosed with respect to the following experiments while remaining within the spirit and scope of the present disclosure.

Figure 4A:
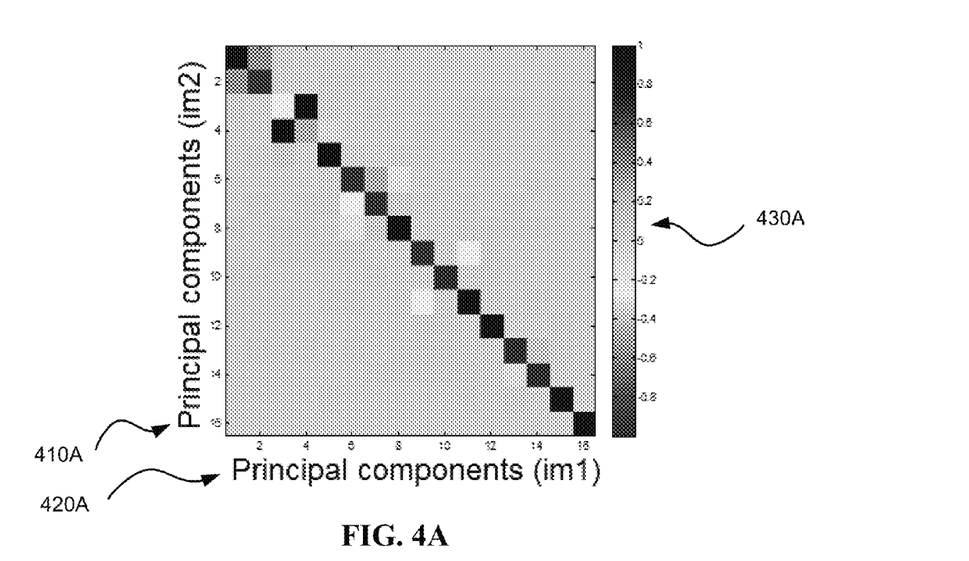
FIG. 4A presents an experimental saliency graph of two mammograms from the same patient according to some embodiments of the present disclosure.
Figure 4B:
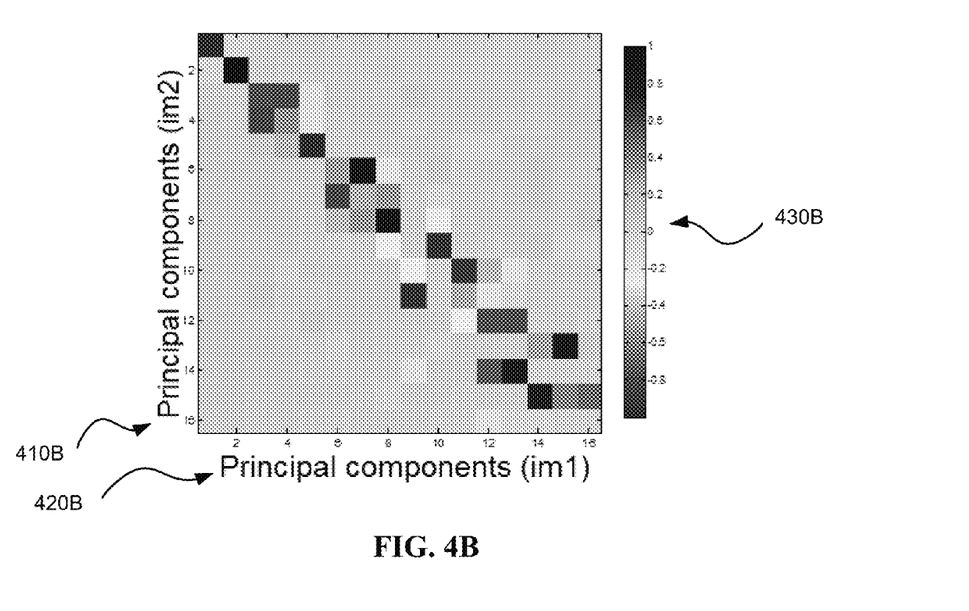
FIG. 4B presents an experimental saliency graph of two mammograms from different patients according to some embodiments of the present disclosure.

Referring now to FIG. 4, shown is an example set of results in accordance with some embodiments of the present disclosure. FIG. 4A presents a saliency graph of two mammograms from the same patient while FIG. 4B presents a saliency graph of two mammograms from different patients. As shown, the y-axis 410A and 410B presents the 16 selected principal components of the second image (im2) which are ordered from most variation (top) to least variation (bottom). Similarly, the x-axis 420A and 420B presents the 16 selected principal components of the first image (im1) from most variation (left) to least variation (right). The values of the cells created by the graph are notated by the scale 430A and 430B. In some embodiments, the scale is the cosine of the angle formed between the principal component of the patch corresponding to the location on the y-axis 410A and 410B and the principal component of the patch corresponding to the location on the x-axis 420A and 420B for each respective combination of principal components presented by the grid. In some embodiments the values on the scale are presented in color while in alternative embodiments the values on the scale are presented in grayscale.

As can be seen in FIG. 4A, an approximately diagonal line is formed from the top left to the bottom right of the grid. The diagonal line is comprised of values approximately equal to 1 or −1 as indicated by the scale 430A. The diagonal line represents matched variation rankings along the principal components of the respective patches of the two images. That is to say, the patch of image 1 having the highest degree of variation along its principal component and the patch of image 2 having the highest degree of variation along its principal component are approximately parallel as indicated by the value of approximately 1 or −1 wherein the value represents the cosine of the angle formed between the two principal components of the two image patches. Thus, the principal components of the patches of each image having the same relative degree of variation (with respect to the other PCs of the respective images) will be approximately parallel to one another in images of approximately the same subject.

Asymmetries can be detected in cases where the diagonal line of approximately 1 or −1 values is discontinuous. As can be seen in FIG. 4A, the third and fourth principal components of image 1 and image 2 disrupt the diagonal pattern. This indicates a possible asymmetry between the images at the patches of the principal components having the third and fourth highest levels of variation along their respective PCs.

In contrast, as can be seen in FIG. 4B presenting the saliency graph of two mammograms from two different patients, the diagonal aligning PCs with similar relative degrees of variation is not well defined. This demonstrates that the PCs having similar relative degrees of variation are not approximately parallel to one another, and, thus, are not very similar. Furthermore, the comparison of FIG. 4A to FIG. 4B demonstrates that, regardless of orientations or translations of the two images with respect to one another, the principal component of the patch having the highest degree of variation in the first image and the principal component of the patch having the highest degree of variation in the second image reflects approximately the same portion of each image unless there is an asymmetry.

Thus, FIG. 4 demonstrates the utility of some embodiments of the present disclosure. Specifically, FIG. 4A in comparison to FIG. 4B demonstrates the principal components of each patch of each image, ordered according to the degree of variation, have similar orientations in cases where the images are approximately similar. However, discontinuities, as seen in the third and fourth principal components of FIG. 4A occur in patches which can represent asymmetries (e.g., tumors) in the various images.

In addition to the experimental output illustrated in FIG. 4 demonstrating the integrity of image analysis using some embodiments of the present disclosure, two experiments are further conducted to measure the validity of some embodiments of the present disclosure in comparison to other methods.

A first experiment involved tumor detection of 20 skull-stripped multi-modal magnetic resonance (MR) images including high grade gliomas (BRATS2014 training set). Thus, the first experiment seeks asymmetries between a symmetric single image (i.e., the left and right sides of the brain). In the first experiment, patches are created having dimensions 3×3×4 cubes in two scale wherein the third dimension represents the four MRI channels. A cross saliency map is created for each slice, and a salient volume is identified by identifying a set of salient regions within the various cross saliency maps. In some embodiments, identification of the salient volume uses mean-shift clustering techniques to identify salient regions. In some embodiments, the salient volume comprises the chain of salient regions having the maximum saliency score at their respective centroids.

The results of the tumor detection are compared to the ground truth (e.g., the accepted size, shape, and location of the gliomas) using the Dice score. The average Dice score is 0.753±0.039. For reference, a published experiment using the random forest (RF) method generated an average Dice score of 0.763±0.027. Thus, as appreciated by one skilled in the art, the method employed in some embodiments of the present disclosure achieves similar results as other methods while providing the added benefits of, though not limited to, being an unsupervised method and not requiring image alignment in various embodiments.

Figure 5A:
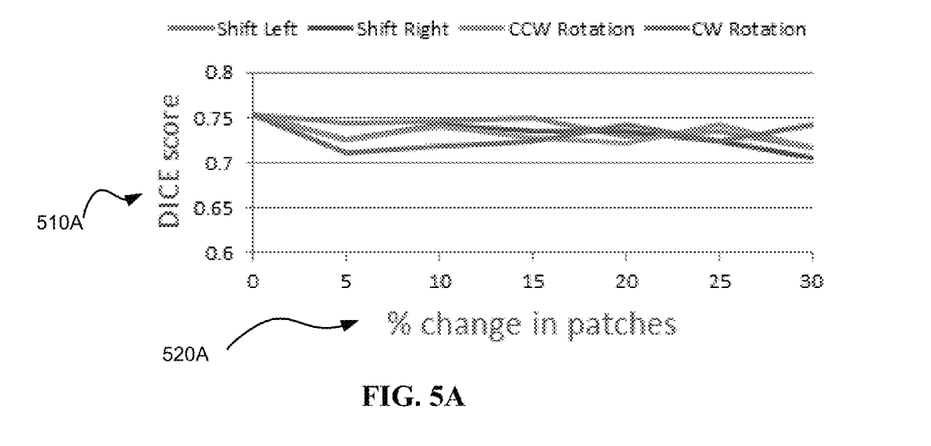
FIG. 5A shows experimental changes in Dice score as a function of the percentage of dislocated patches for left and right translations and clockwise and counterclockwise rotations in accordance with some embodiments of the present disclosure.
Figure 5B:
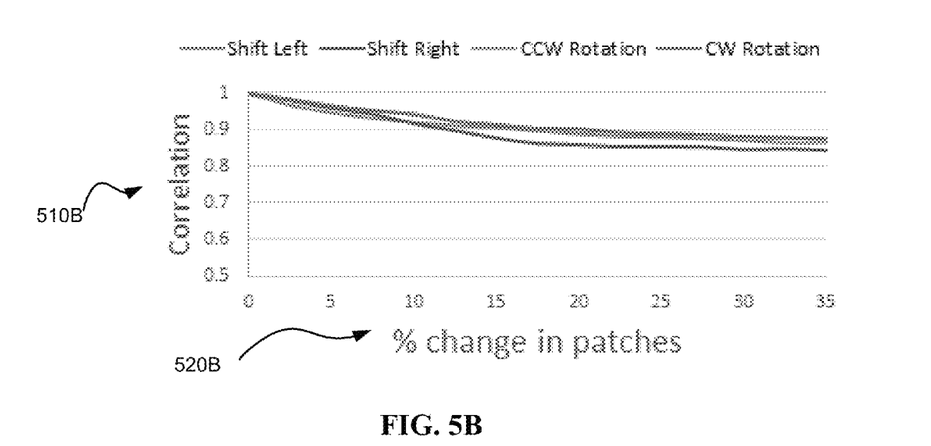
FIG. 5B shows experimental correlations between patches as a function of a percentage of dislocated patches for left and right translations and clockwise and counterclockwise rotations according to some embodiments of the present disclosure.

Referring now to FIG. 5, shown are graphs monitoring the integrity of the method used in the first experiment as a function of dislocated patches resulting from variations in the line of symmetry. The results of the first experiment were checked for stability under variation in Mid-Sagittal Plane Estimation. Specifically, the stability test evaluated the robustness of the data in events where the line of symmetry may be incorrectly calculated (or, in this case, intentionally altered). The mid-sagittal line was translated 1 to 15 pixels in either direction, or rotated 1 to 15 degrees both clockwise and counterclockwise. Each shift dislocates approximately 2.5% of the patches from one side of the image to the other side of the image.

FIG. 5A shows the changes in Dice score 510A as a function of the percentage of dislocated patches 520A for left and right translations and clockwise and counterclockwise rotations. As can be seen, the majority of the Dice scores remain within the error of the average Dice score (0.753±0.039). Thus, an additional advantage of some embodiments of the present disclosure is robustness of the analysis in cases where the line of symmetry may be mis-identified.

FIG. 5B shows the level of correlation 510B of the method of the first experiment between patches as a function of percentage dislocated patches 520B for left and right translations and clockwise and counterclockwise rotations. As shown, the correlation is greater than or equal to 0.95 for patch dislocation up to 7.5% and greater than or equal to 0.90 for patch dislocation up to 22.5% in various shifts. Thus, FIG. 5B demonstrates robustness of cross correlations in cases where the line of symmetry may be mis-identified.

A second experiment involved tumor detection in breast mammograms. Thus, the second experiment seeks asymmetries between a symmetric pair of organs (i.e., left and right breasts). The second experiment evaluated left and right mediolateral oblique view (MLO) scans of 40 patients receiving full-field digital (FFD) mammograms. Each tumor was delineated by a radiologist. A total of 42 tumors ranging in size from 4 to 83 mm were identified.

The second experiment evaluated the mammogram data using three techniques. The first technique employed spatial techniques (i.e., patch intensity histogram, mean intensity, standard deviation of intensities, and relative position to the nipple in polar coordinates). The second technique aligned the images using thin-plate spline (TPS) alignment, followed by the same spatial features previously mentioned in addition to an earth movers distance (EMD) flow vector. The third technique (the technique herein disclosed according to some embodiments) uses spatial features, CPD, and NNE measures computed on 9×9 patches in four down-sampling factors (2, 4, 8, 16). The results of the hereinabove described test are recorded in Table 1:

TABLE 1

| Measure | Spatial Features | Spatial Features + TPS + EMD | Spatial Features + CPD + NNE |
|---|---|---|---|
| AUC | 0.88 | 0.88 | 0.93 |
| Sensitivity | 0.72 ± 0.05 | 0.82 ± 0.002 | 0.88 ± 0.03 |
| Specificity | 0.82 ± 0.013 | 0.73 ± 0.008 | 0.82 ± 0.018 |

Area under the curve (AUC), sensitivity, and specificity were measured for comparison purposes of the three techniques previously described. AUC refers to the overall accuracy of the method (i.e., AUC accounts for positively identified positives, negatively identified positives, negatively identified negatives, and negatively identified positives). Sensitivity refers to the ability of the technique to correctly identify parts of the tumor. Specificity refers to the ability of the technique to correctly identify parts which do not comprise a tumor.

Thus, as can be seen, embodiments of the method described in the present disclosure produced a higher AUC score compared to both competitors, a higher sensitivity score compared to both competitors, and an equal are higher specificity score compared to both competitors. Thus, the results of the second experiment demonstrate the increased accuracy of some embodiments of the present disclosure over alternative methods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed approximately concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for comparing images, the method comprising:
identifying a first image and a second image;
partitioning each image to create a respective set of patches for each image, wherein each patch comprises a plurality of pixels;
determining a respective difference between at least a portion of the patches of each respective image and an average patch of the respective image;
identifying a respective minimum cost translation for each patch of the first image to a corresponding patch of the second image, wherein each translation is independent of each other translation, wherein the minimum cost translation comprises a minimum change in a set of patch statistics between a first patch, or portion thereof, of the first image and the corresponding patch, or portion thereof, of the second image; and
calculating a respective score for at least a portion of the patches, wherein each score comprises the respective difference and the respective minimum cost translation.

2. The method of claim 1, wherein determining a respective difference further comprises:
determining at least one respective principal component of each image;
determining at least one respective principal component of each patch of each image;
matching each patch of the first image to a nearest match patch of the second image to create a set of matched patches;
selecting, based on the matching, a subset of patches of the first image and a subset of patches of the second image; and
determining a respective difference between each patch of the subset of patches and the average patch for each respective image, the difference comprising a difference in patch statistics, the difference being measured with respect to at least one principal component of the respective image.

3. The method of claim 2, wherein selecting, based on the matching, a subset of patches of the first image and a subset of patches of the second image comprises selecting the subset of patches having a difference in variance above a first threshold, wherein the difference in variance is based on a variance with respect to a principle component of a first patch of the first image and a variance with respect to a same principle component of a second patch of the second image, wherein the first patch and the second patch are a pair of patches in the set of matched patches.

4. The method of claim 2, the matching further comprising:
calculating the at least one respective principal component of each patch of each image;
identifying a plurality of sets of associations, wherein each respective set of associations comprises a plurality of associations such that each patch of the first image is uniquely matched to a respective patch of the second image;
calculating a respective cost of each set of associations, wherein the cost comprises a sum of each respective cost of each association; and
selecting the set of associations having a lowest cost.

5. The method of claim 4, wherein calculating a respective cost of each set of associations comprises summing, for each pair of patches in the set of associations, a respective cost based on an angle formed between a principal component of a first patch and a principal component of a second patch, wherein the first patch and the second patch are a pair of patches in the respective set of associations.

6. The method of claim 1, wherein identifying a minimum cost translation further comprises:
assigning a first set of random displacement vectors to at least one pixel of a selected patch of the first image, wherein the first set of random displacement vectors has a first range of randomness,
computing, for each random displacement vector in the first set of random displacement vectors, a respective difference in pixel statistics of each at least one pixel of the selected patch of the first image to a corresponding at least one pixel of a second patch of the second image, wherein the corresponding at least one pixel of the second patch is determined by the random displacement vector of the first set of random displacement vectors;
selecting a first displacement vector of the first set of random displacement vectors having a lowest difference in pixel statistics;
assigning a second set of random displacement vectors to at least one pixel of the selected patch of the first image, the second set of random displacement vectors having a second range of randomness less than the first range of randomness, wherein the second range of randomness is a function of the first displacement vector.

7. The method of claim 1, wherein identifying a first image and a second image comprises identifying two portions of an image, wherein the two portions are separated by an axis of symmetry.

8. A system for comparing images, the system comprising:
a memory configured to store a first image and a second image;
a graphical display configured to display an output; and
a processor coupled to the graphical display and to the memory, the processor configured to:
obtain the first image and the second image from the memory;
partition each of the first and second images to create a plurality of respective patches for each image, wherein each patch comprises a plurality of pixels;
determine a respective difference between at least one patch, or portion thereof, of each respective image and an average patch, or portion thereof, of the respective image;
identify a respective selective shift for each patch, or portion thereof, of the first image to a corresponding patch, or portion thereof, of the second image, wherein each shift is independent of each other shift, wherein the selective shift represents a minimum change in a set of pixel statistics between a respective patch, or portion thereof, of the first image and the corresponding patch, or portion thereof, of the second image;

calculate a respective score for at least a portion of the patches, the score comprising the respective difference and the respective selective shift; and output at least one score to the graphical display for displaying on the graphical display.

9. The system of claim 8, wherein the processor is configured to determine a respective difference by:

determining at least one respective principal component of each image;

determining at least one respective principal component of each patch of each image;

matching each patch of the first image to a nearest match patch of the second image to create a set of matched patches;

selecting, based on the set of matched patches, a subset of patches of the first image and a subset of patches of the second image;

determining the respective difference between each patch of each respective subset of patches and the average patch for each respective image, the difference being measured with respect to at least one principal component of the respective image.

10. The system of claim 9, wherein the processor is configured to select a subset of patches of the first image and a subset of patches of a second image by selecting the subset of patches based on a difference in variance between a variance of a principle component of a first patch, and a variance along a same principle component of a second patch, wherein the difference in variance is above a first threshold, wherein the first patch and the second patch are a pair of patches in the set of matched patches.

11. The system of claim 9, wherein the processor is configured to match each patch by:

calculating at least one respective principal component of each patch of each image;

identifying a plurality of sets of associations, wherein each set comprises a plurality of associations such that each patch of the first image is uniquely matched to a single patch of the second image;

calculating a respective cost of each set of associations, wherein the cost comprises a sum of each respective cost of each association; and selecting the set of associations having a lowest cost.

12. The system of claim 11, wherein the processor is configured to calculate the respective cost of each set of associations by calculating the respective cost based on an angle formed between at least one principal component of a first patch and at least one principal component of a second patch, wherein the first patch and the second patch are a pair of patches in the set of matched patches.

13. The system of claim 8, wherein the processor is configured to obtain the first image and the second image by separating a single image along an axis of symmetry.

14. The system of claim 8, wherein the processor is configured to identify a selective shift by:

assigning a first set of random displacement vectors to at least one pixel of a selected patch of the first image, wherein the first set of random displacement vectors has a first range of randomness;

computing, for each random displacement vector in the first set of random displacement vectors, a respective difference in pixel statistics of each at least one pixel of the selected patch of the first image to a corresponding at least one pixel of a second patch of the second image, wherein the corresponding at least one pixel of the second patch is determined by a random displacement vector of the first set of random displacement vectors;

selecting a first displacement vector of the first set of random displacement vectors having a lowest difference in pixel statistics; and assigning a second set of random displacement vectors to each at least one pixel of the selected patch of the first image, the second set of random displacement vectors having a second range of randomness, wherein the second range of randomness is a function of the first displacement vector, wherein the second range of randomness is less than the first range of randomness.

* * * * *